No. 749,338. PATENTED JAN. 12, 1904.
J. H. TAYLOR.
PIPE.
APPLICATION FILED JUNE 9, 1902.
NO MODEL.
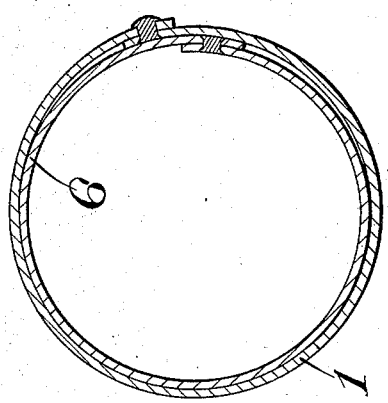
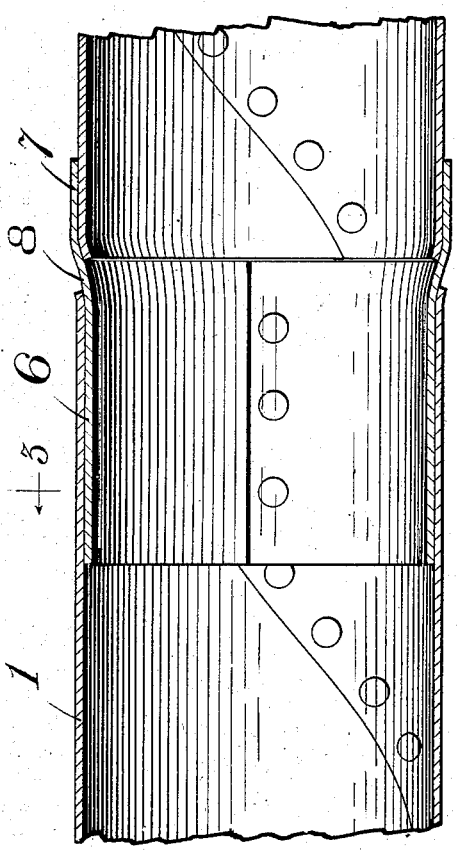
Witnesses:
Leonard W. Novander,
Lynn A. Williams
Inventor,
James Hall Taylor
By Charles A. Brown & Cragg
Attorneys No. 749,338.　　　　　　　　　　　　　　　　　　　Patented January 12, 1904.

UNITED STATES PATENT OFFICE.

JAMES HALL TAYLOR, OF CHICAGO, ILLINOIS, ASSIGNOR TO AMERICAN SPIRAL PIPE WORKS, OF CHICAGO, ILLINOIS, A CORPORATION OF ILLINOIS.

PIPE.

SPECIFICATION forming part of Letters Patent No. 749,338, dated January 12, 1904.

Application filed June 9, 1902. Serial No. 110,847. (No model.)

*To all whom it may concern:*

Be it known that I, JAMES HALL TAYLOR, a citizen of the United States, residing at Chicago, in the county of Cook and State of Illinois, have invented a certain new and useful Improvement in Pipes, (Case No. 7,) of which the following is a full, clear, concise, and exact description, reference being had to the accompanying drawings, forming a part of this specification.

My invention relates to pipe, and has for its object the provision of an improved form of pipe composed of units assembled after the manner of my invention. Heretofore great difficulty has been experienced in assembling units of pipe, owing to the inferior relative formation of such units.

In practicing my invention I employ a plurality of lengths of pipe of substantially uniform diameter throughout, there being interposed between the contiguous lengths of pipe a short section of pipe constituting a coupling and having a diameter at one end sufficient to encompass the contiguous end of a length of pipe and a diameter at the other end sufficiently reduced to be encompassed by the length of the pipe immediately adjacent to this end. The inclination between the portions of each coupling of large and small diameter is preferably comparatively abrupt, whereby the portions of the coupling of different size are each of a substantially uniform diameter throughout. By providing this abrupt wall portion uniting the large and small ends of the coupling the inserted length of tubing may be slightly upset as it is forced into place to form a very tight joint, while the end of the length of tubing inclosing the smaller portion of the coupling may be slightly curved, whereby a very thorough clamping engagement is secured between the united lengths of the pipe and the coupling.

I will explain my invention more fully by reference to the accompanying drawings, in which—

Figure 1 is a plan view of a composite pipe embodying the invention. Fig. 2 is an axial sectional view showing the contiguous ends of two lengths of pipe united by a coupling member. Fig. 3 is a cross-sectional view on line 3 3 of Fig. 2.

Like parts are indicated by similar characters of reference throughout the different figures.

The composite pipe embodying the invention comprises a plurality of lengths of pipe or tubing 1 2 3, united by couplings 4 and 5, each coupling having a reduced end portion 6 of substantially uniform diameter throughout and an enlarged end portion 7 of substantially uniform diameter throughout, the portions 6 and 7 of the coupling being united by a slanting portion 8.

The composite pipe is constructed by having the reduced end portion 6 of each coupling inserted within the contiguous section or unit of pipe, while the larger end portion 7 of each coupling is made to inclose the next unit or length of pipe. The sections or units of pipe thus united by means of the couplings may be slightly upset, as indicated in Fig. 2, where the inclosed end of a unit of pipe is shown slightly curled inwardly, while the unit of pipe that incloses the coupling is slightly curled outwardly, whereby thorough clamping engagement is secured between the units of pipe and the coupling.

The units of pipe 1, 2, and 3 are of uniform diameter throughout, whereby they may be readily assembled together by means of the couplings constructed as specified.

I believe a composite pipe constructed as shown and described is new with me.

The particular form of pipe illustrated is a spiral pipe formed by means of a ribbon of metal spirally disposed and riveted where the edges overlap.

Having thus described my invention, I claim as new and desire to secure by Letters Patent—

1. A composite pipe, comprising a plurality of lengths of spiral pipe 1, 2, 3, couplings 4 and 5 uniting said lengths, each coupling having a reduced end portion 6 of substantially uniform diameter throughout, adapted to be encompassed by the end of a pipe, and an enlarged end portion 7 of substantially uniform diameter throughout, adapted to encompass the end of a pipe, the portions 6 and 7 of the coupling being united by an abruptly-slanting portion 8, substantially as described.

2. A composite pipe, comprising a plurality of lengths of spiral pipe 1, 2, 3, couplings 4 and 5 uniting said lengths, each coupling having a reduced end portion 6 of substantially uniform diameter throughout, adapted to be encompassed by the end of a pipe, and an enlarged end portion 7 of substantially uniform diameter throughout, adapted to encompass the end of a pipe, the portions 6 and 7 of the coupling being united by an abruptly-slanting portion 8, the edge of the end encompassed by the coupling being slightly curled inwardly, while the edge of the end encompassing the joint is slightly curled outwardly, whereby thorough clamping engagement is secured between the units of pipe and the coupling, substantially as described.

In witness whereof I hereunto subscribe my name this 4th day of June, A. D. 1902.

JAMES HALL TAYLOR.

Witnesses:
HARVEY L. HANSON,
JOHN STAHR.